(12) United States Patent
Padula et al.

(10) Patent No.: US 8,505,600 B2
(45) Date of Patent: Aug. 13, 2013

(54) INTEGRATED ROTARY UNION AND HUB CAP

(75) Inventors: Santo Padula, Medina, OH (US); Jesse W. Cervantez, Navarre, OH (US); Roger W. Loar, North Lawrence, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 5 days.

(21) Appl. No.: 12/466,511

(22) Filed: May 15, 2009

(65) Prior Publication Data

US 2009/0283190 A1 Nov. 19, 2009

Related U.S. Application Data

(60) Provisional application No. 61/053,757, filed on May 16, 2008.

(51) Int. Cl.
*B60C 23/10* (2006.01)

(52) U.S. Cl.
USPC .......................................... 152/417; 152/415

(58) Field of Classification Search
USPC .............. 152/415, 416, 417; 73/146.2, 146.3
See application file for complete search history.

(56) References Cited

U.S. PATENT DOCUMENTS

| | | | |
|---|---|---|---|
| 1,112,596 A | 10/1914 | Burggraf, Jr. | |
| 2,107,405 A | 2/1938 | Williams | |
| 3,276,503 A | * | 10/1966 | Kilmarx ........................ 152/417 |
| 4,387,931 A | 6/1983 | Bland | |
| 4,678,017 A | 7/1987 | Schultz | |
| 4,844,138 A | 7/1989 | Kokubu | |
| 4,883,106 A | 11/1989 | Schultz et al. | |
| 4,924,926 A | 5/1990 | Schultz et al. | |
| 4,932,451 A | 6/1990 | Williams et al. | |
| 5,287,906 A | 2/1994 | Stech | |

(Continued)

FOREIGN PATENT DOCUMENTS

| | | |
|---|---|---|
| WO | 0102196 A1 | 1/2001 |
| WO | 2004080729 A2 | 9/2004 |

OTHER PUBLICATIONS

Reineke Company, Inc., Pressure Guard(TM) Tire Inflation Systems brochure 2003, entire document.

(Continued)

*Primary Examiner* — Kip T Kotter (74) *Attorney, Agent, or Firm* — Dureska, Kennedy & Moore, L.L.C.; David P. Dureska; Edward T. Kennedy (57) ABSTRACT

A rotary union is integrated into the interior of a heavy-duty vehicle hub cap. The hub cap includes a cylindrical sidewall, and an outboard wall that is integrally formed with an outboard end of the sidewall, and which extends generally perpendicular to the sidewall. The hub cap also includes a radially-extending flange that is formed on an inboard end of the sidewall, which receives fasteners to mount the hub cap on a wheel hub. The sidewall and the outboard wall form an interior compartment in the hub cap, and a rotary union is mounted to the hub cap in the interior compartment. The rotary union is mounted on the inboard surface of the outboard wall of the hub cap and is in general axial alignment with an axial centerline of a wheel end assembly, providing fluid communication from a tire inflation system to the tires of the vehicle.

18 Claims, 11 Drawing Sheets

(56) References Cited

U.S. PATENT DOCUMENTS

| | | | |
|---|---|---|---|
| 5,377,736 A | 1/1995 | Stech | |
| 5,398,743 A | 3/1995 | Bartos | |
| 5,429,167 A | 7/1995 | Jensen | |
| 5,584,949 A | 12/1996 | Ingram | |
| 5,769,979 A | 6/1998 | Naedler | |
| 6,105,645 A | 8/2000 | Ingram | |
| 6,131,631 A | 10/2000 | Bradley et al. | |
| 6,145,559 A * | 11/2000 | Ingram, II | 152/417 |
| 6,182,727 B1 | 2/2001 | Beesley | |
| 6,244,316 B1 | 6/2001 | Naedler | |
| 6,260,595 B1 | 7/2001 | Cobb | |
| 6,325,124 B1 | 12/2001 | Colussi et al. | |
| 6,394,556 B1 | 5/2002 | Ingram | |
| 6,401,743 B1 | 6/2002 | Naedler | |
| 6,425,427 B1 * | 7/2002 | Stech | 152/417 |
| 6,435,238 B1 | 8/2002 | Hennig | |
| 6,484,774 B1 | 11/2002 | Naedler | |
| 6,585,019 B1 * | 7/2003 | Ingram | 152/417 |
| 6,698,482 B2 | 3/2004 | Hennig et al. | |
| 6,968,882 B2 | 11/2005 | Ingram | |
| 7,117,909 B2 | 10/2006 | Jarrett et al. | |
| 7,207,365 B2 * | 4/2007 | Nelson et al. | 152/417 |
| 7,273,082 B2 | 9/2007 | White et al. | |
| 7,302,980 B2 | 12/2007 | Ingram | |
| 2005/0133134 A1 | 6/2005 | Ingram et al. | |
| 2005/0156463 A1 | 7/2005 | Hennig et al. | |
| 2005/0194079 A1 | 9/2005 | Hennig | |
| 2007/0227640 A1 | 10/2007 | Ingram | |
| 2008/0185086 A1 | 8/2008 | Ingram | |

OTHER PUBLICATIONS

Schmitz Cargobull, Rotos Drive Technology Information brochure, estimated publication 2006, entire document.

Schmitz Cargobull, Range of Commerical Vehicles brochure, 2006, entire document.

* cited by examiner

INTEGRATED ROTARY UNION AND HUB CAP

CROSS-REFERENCE TO RELATED APPLICATIONS

This application claims the benefit of U.S. Provisional Patent Application Ser. No. 61/053,757, which was filed on May 16, 2008.

BACKGROUND OF THE INVENTION

1. Technical Field

The invention relates to the art of tire inflation systems for heavy-duty vehicles such as tractor-trailers or semi-trailers. More particularly, the invention relates to a rotary union for use in a tire inflation system for heavy-duty vehicles. Still more particularly, the invention is directed to a rotary union that is integrated into the interior of a hub cap of a wheel end assembly, which simplifies installation of the rotary union and reduces potential damage to the rotary union, thereby extending the life of the rotary union.

2. Background Art

Reference herein is made to tractor-trailers and semi-trailers by way of example, with the understanding that such reference applies to other heavy-duty vehicles, such as straight trucks. All tractor-trailers include at least one trailer, and sometimes two or three trailers, all of which are pulled by a single tractor. Each trailer includes a frame, from which at least one axle is suspended. A wheel end assembly is rotatably mounted on each end of the axle. More specifically, each wheel end assembly typically includes a wheel hub rotatably mounted on a bearing assembly that in turn is immovably mounted on a respective one of each of the ends of the axle, commonly known as an axle spindle. In this manner, the bearing assemblies enable each wheel hub to rotate about a respective axle spindle. A tire is, in turn, mounted on the wheel hub in a manner well known to those having skill in the art.

For normal operation of the wheel end assembly to occur, the bearing assembly and surrounding components must be lubricated with grease or oil. Therefore, the wheel end assembly must be sealed to prevent leakage of the lubricant, and also to prevent contaminants from entering the assembly, both of which could be detrimental to its performance. To seal the wheel end assembly, a hub cap is mounted on an outboard end of the wheel hub, and a main seal is rotatably mounted on an inboard end of the hub and the bearing assembly in abutment with the axle spindle, thereby creating a closed or sealed wheel end assembly.

Turning now to the tires that are mounted on the wheel hub, each trailer typically includes eight or more tires, each of which is inflated with air. Optimally, each tire is inflated to a recommended pressure that is usually between about 70 pounds per square inch (psi) and about 130 psi. However, it is well known that air may leak from a tire, usually in a gradual manner, but sometimes rapidly if there is a problem with the tire, such as a defect or a puncture caused by a road hazard. As a result, it is necessary to regularly check the air pressure in each tire to ensure that the tires are not under-inflated. Should an air check show a tire that is under-inflated, it is desirable to enable air to flow into the tire to return it to an optimum tire pressure.

The large number of tires on any given trailer setup makes it difficult to manually check and maintain the optimum tire pressure for each and every tire. This difficulty is compounded by the fact that multiple trailers in a fleet may be located at a site for an extended period of time, during which the tire pressure might not be checked. Any one of these trailers might be placed into service at a moment's notice, leading to the possibility of operation with under-inflated tires. Such operation may increase the chance of failure of a tire in service or may lead to less efficient operation of the vehicle as compared to operation with tires in an optimum inflation range.

Moreover, should a tire develop a leak, for example, as a result of striking a road hazard, the tire could fail if the leak continues unabated as the vehicle travels over-the-road. The potential for tire failure often is more pronounced in vehicles such as tractor-trailers that travel for long distances and/or extended periods of time.

As a result of such concerns, systems known in the art as tire inflation systems were developed. Tire inflation systems attempt to automatically monitor the pressure in a vehicle tire and/or inflate the vehicle tire with air to a minimum tire pressure as the vehicle is moving. Many of these automated systems utilize rotary unions that transmit air from a pressurized axle or air line to the rotating tires. The rotary union thus provides the interface between static components and the rotating wheel components. As a result, a rotary union typically is mounted in or near the outboard end of an axle spindle, and is fluidly attached to an outgoing air line which pneumatically connects to its respective tire proximate the axle spindle. Rotary unions of the prior art consist primarily of two designs, each of which exhibits disadvantages.

The first type of prior art rotary union is mounted in the outboard end of an axle spindle. These rotary unions have an outgoing air line that must exit the hub cap that seals the outboard end of the wheel end assembly. As the air line exits the hub cap, an elbow fitting or a tee fitting is often employed to enable the outgoing air line to extend to one or two tires mounted on that axle spindle. The elbow or tee fitting is attached to the exterior of the hub cap, which increases the possibility that the fitting can be damaged. Such damage may undesirably compromise the integrity of the tire inflation system, and/or may at least create a need to replace the fitting and other components of the system. To reduce the possibility of such damage, a guard typically is installed to protect the elbow or tee fitting, which results in increased cost and weight, and adds an additional component that must be removed and replaced when servicing the components of the wheel end assembly or the tire inflation system.

The second type of prior art rotary union is mounted on the exterior of the hub cap. These rotary unions include an outgoing air line that extends to the tire, and an inboardly-extending air tube which extends from the body of the rotary union, through the hub cap and into the axle spindle. During installation of such exterior rotary unions, the inboardly-extending air tube can be misaligned, resulting in premature wear of the bearings of the rotary union, which undesirably shortens the life of the rotary union. In addition, the mounting of the rotary union on the exterior of the hub cap causes the rotary union itself to extend outboardly of the hub cap, thereby increasing the possibility that the rotary union may undesirably be damaged and require replacement.

As a result, the potential damage and misalignment that are associated with prior art rotary unions makes it desirable to develop a rotary union that overcomes such disadvantages. The present invention satisfies these needs by providing a rotary union that is integrated into the interior of a hub cap, thereby simplifying and improving installation of the rotary union, and protecting the rotary union from damage.

BRIEF SUMMARY OF THE INVENTION

An objective of the present invention is to provide a rotary union for a tire inflation system that is easier to install, thereby reducing misalignment of components associated with the rotary union.

Another objective of the present invention is to provide a rotary union for a tire inflation system that is protected without the use of additional guards or the like.

These objectives and others are obtained by the integrated rotary union and hub cap of the present invention. In an exemplary embodiment of the invention, a wheel end assembly includes a wheel hub having an outboard end, and the integrated rotary union and hub cap includes a hub cap portion. The hub cap portion includes at least one wall forming an interior compartment in the hub cap portion. The wall includes means for mounting the hub cap portion on the outboard end of the wheel hub. The integrated rotary union and hub cap also includes a rotary union portion. The rotary union portion is mounted on the hub cap portion in the interior compartment, and provides fluid communication from a tire inflation system to tires of the vehicle when the hub cap portion is mounted on the outboard end of the wheel hub.

BRIEF DESCRIPTION OF THE SEVERAL VIEWS OF THE DRAWINGS

The preferred embodiments of the present invention, illustrative of the best mode in which applicants have contemplated applying the principles, are set forth in the following description and are shown in the drawings, and are particularly and distinctly pointed out and set forth in the appended claims.

Similar numerals refer to similar parts throughout the drawings.

DETAILED DESCRIPTION OF THE INVENTION

Figure 1:
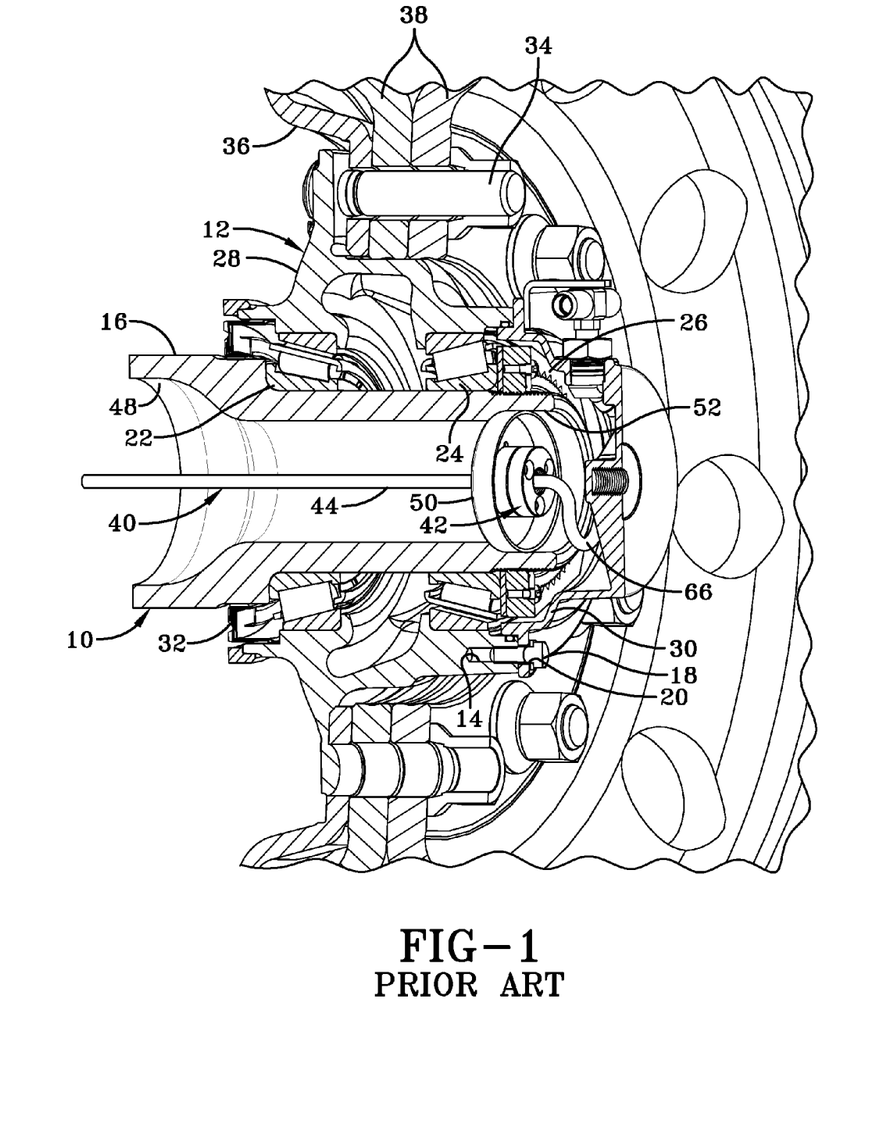
FIG. 1 is a fragmentary cross-sectional perspective view of a portion of an axle spindle and a wheel end assembly, and showing certain components of a tire inflation system including a rotary union of the prior art, and a brake drum and tire rims mounted on the hub of the wheel end assembly.

In order to better understand the integrated rotary union and hub cap of the present invention, a prior art rotary union is shown installed in an axle spindle in FIG. 1, and the prior art rotary union and its environment now will be described. Axle 10 depends from and extends transversely across the trailer of a heavy-duty tractor-trailer (not shown). A typical heavy-duty tractor-trailer includes one or more non-drive axles 10 suspended from the trailer, with each of the axles having a wheel end assembly 12 mounted on each end of the axle. For the sake of clarity, only one axle end and wheel end assembly 12 will be described herein. Axle 10 includes a central tube (not shown), and an axle spindle 16 is integrally connected, by any suitable means such as welding, to each end of the central tube.

Wheel end assembly 12 includes a bearing assembly having an inboard bearing 22 and an outboard bearing 24 immovably mounted on the outboard end of axle spindle 16. A nut assembly 26 threadably engages the outboard end of axle spindle 16 and secures bearings 22, 24 in place. A wheel hub 28 is rotatably mounted on inboard and outboard bearings 22, 24 in a manner well known to those skilled in the art. A hub cap 30 is mounted on the outboard end of hub 28 by a plurality of bolts 18, each one of which passes through a respective one of a plurality of openings 20 formed in the hub cap, and threadably engages a respective one of a plurality of aligned threaded openings 14 formed in the hub. In this manner, hub cap 30 closes the outboard end of wheel end assembly 12. A main continuous seal 32 is rotatably mounted on the inboard end of wheel end assembly 12 and closes the inboard end of the assembly. A plurality of threaded bolts 34 are used to mount a brake drum 36, tire rim 38 and a tire (not shown) on wheel end assembly 12.

Figure 2:
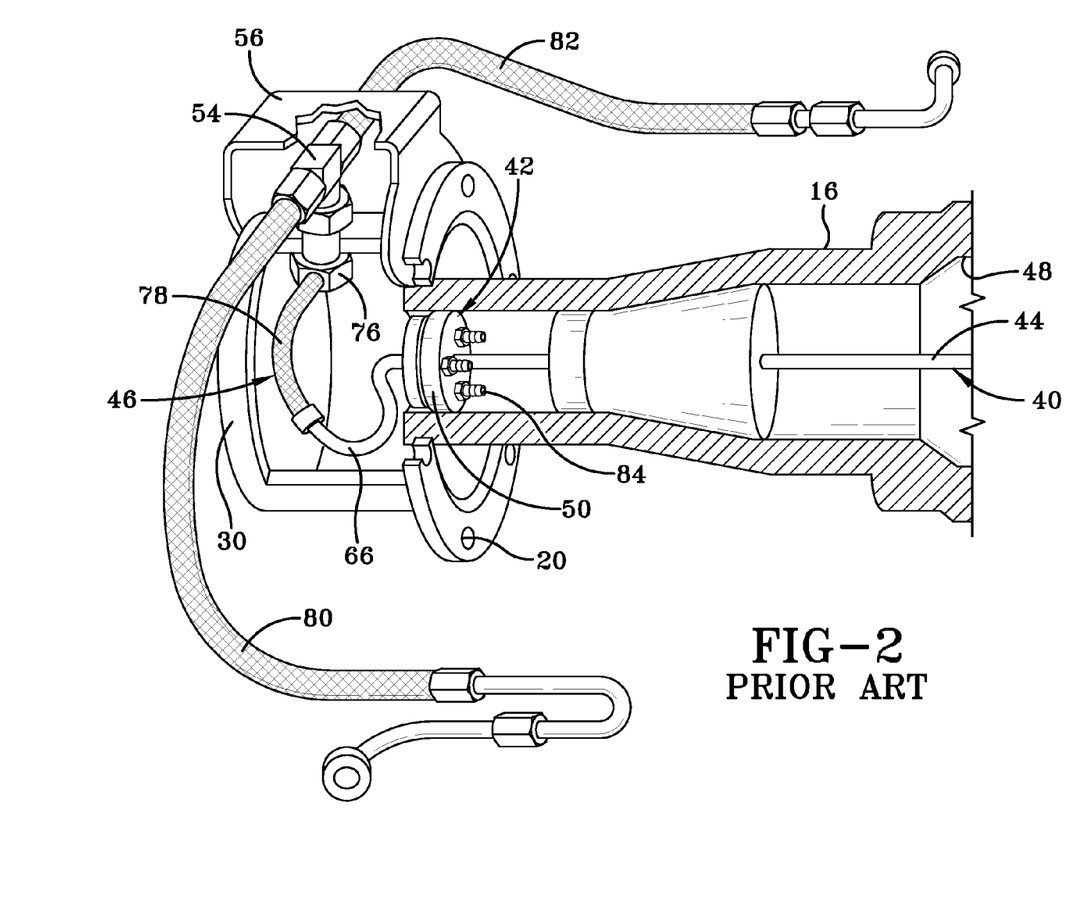
FIG. 2 is a reverse-side fragmentary perspective view, with portions broken away and in section, of the axle spindle, hub cap, rotary union and other selected components shown in FIG. 1.

With additional reference to FIG. 2, an exemplary tire inflation system 40 includes a prior art rotary union 42. Rotary union 42 facilitates the connection of a pneumatic conduit 44 to an air tube assembly 46, which rotates with the tire. Because of the nature of pneumatic conduit 44 extending from a relatively static environment to a rotating dynamic environment, multiple forces that may cause the failure of components are present, showing the importance of the fluid connection established by rotary union 42. More particularly, a central bore 48 is formed in axle 10, through which pneumatic conduit 44 extends toward an outboard end of axle spindle 16. Rotary union 42 is attached to a plug 50 that is press-fit in a machined counterbore section 52 of axle central bore 48 at an outboard end of axle spindle 16, and fluidly connects to pneumatic conduit 44. Alternatively, axle 10 may be pressurized, in which case pneumatic conduit 44 is not utilized, and rotary union 42 fluidly communicates directly with the pressurized air in central bore 48. Air tube assembly 46 is rotatably connected to rotary union 42 under hub cap 30, passes through and is secured to the hub cap, and pneumatically connects to the tires.

Figure 3:
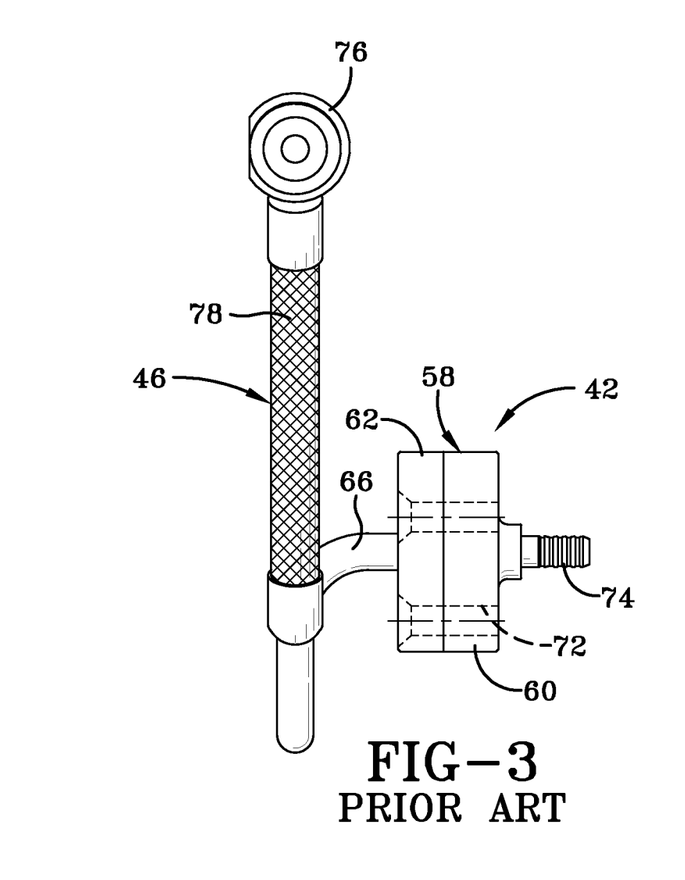
FIG. 3 is a side elevational view, with hidden portions represented by dashed lines, of the rotary union shown in FIGS. 1 and 2.
Figure 4:
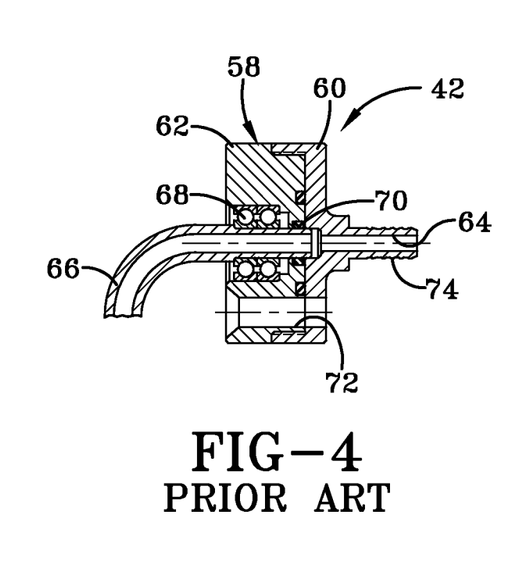
FIG. 4 is a cross-sectional view of the body of the rotary union shown in FIG. 3.

Turning now to FIGS. 3 and 4, prior art rotary union 42 includes a cylindrical body 58 that has an inboard half 60 and an outboard half 62, with the two halves threadably engaging one another. A central bore 64 is formed in body 58, which receives a one-piece rigid air tube 66. Rigid air tube 66 seats on bearings 68, which are housed about central bore 64, and which enable the air tube to rotate with the tire in relation to body 58. A main seal 70 also is located in body 58 about central bore 64. A plurality of screw bores 72 are formed in body 58 to enable screws 84 (FIG. 2) to secure inboard and outboard halves 60, 62 to plug 50. Inboard half 60 of body 58 includes an inboardly extending hose barb 74 to facilitate fluid connection of the rotary union to pneumatic conduit 44 (FIG. 1).

With reference now to FIGS. 2 and 3, air tube assembly 46 connects to and fluidly communicates with rigid air tube 66 of rotary union 42 to convey air from the rotary union to the tires. Air tube assembly 46 includes a first flexible air tube 78 that fluidly connects to rigid tube 66 and leads to a bulkhead fitting 76, which in turn fluidly connects to a tee fitting 54. Tee fitting 54 optionally includes a check valve (not shown). From tee fitting 54, a second flexible air tube 80 is fluidly connected to the tee fitting and extends to an outboard tire, and a third flexible air tube 82 is fluidly connected to the tee fitting and extends to an inboard tire. Each one of second and third flexible air tubes 80, 82, typically includes a check valve (not shown). A guard 56 is attached to hub cap 30 and is formed over tee fitting 54 to protect the tee fitting.

As mentioned above, prior art rotary union 42 requires the use of tee fitting 54, which is mounted on the exterior of hub cap 30, which undesirably increases the possibility that the fitting can be damaged. As a result guard 56 must be employed to protect tee fitting 54, which results in increased cost and weight, and adds an additional component that must be removed and replaced when servicing the components of wheel end assembly 12 or tire inflation system 40.

In the prior art, other types of rotary unions are mounted on the exterior of hub cap 30, and therefore are also prone to damage. Such exteriorly-mounted prior art rotary unions are also subject to misalignment during assembly, since an inboardly-extending air tube that extends through the hub cap and into the axle spindle must be installed. The present invention overcomes these disadvantages, as now will be described.

Figure 5:
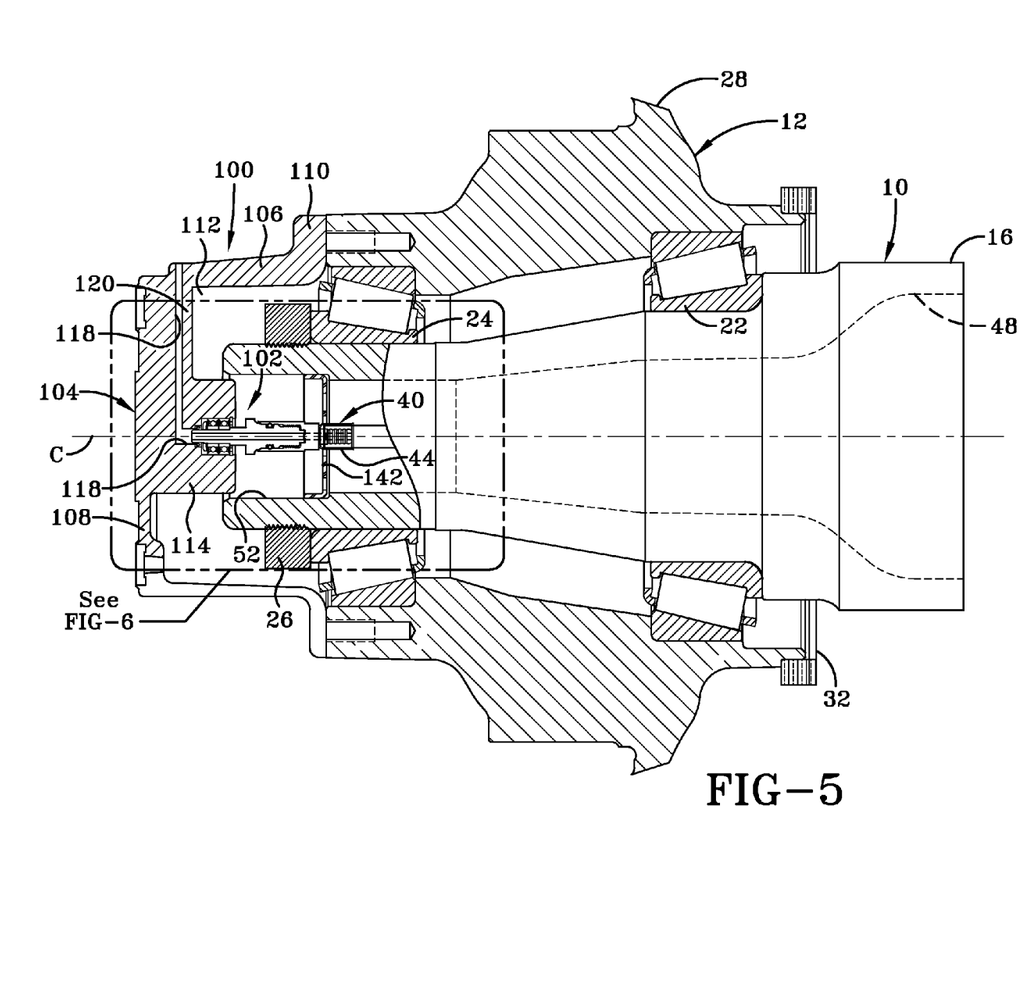
FIG. 5 is a fragmentary cross-sectional elevational view of an axle spindle and wheel end assembly, with hidden portions shown in dashed lines, and showing a first embodiment integrated rotary union and hub cap of the present invention mounted thereon.
Figure 6:
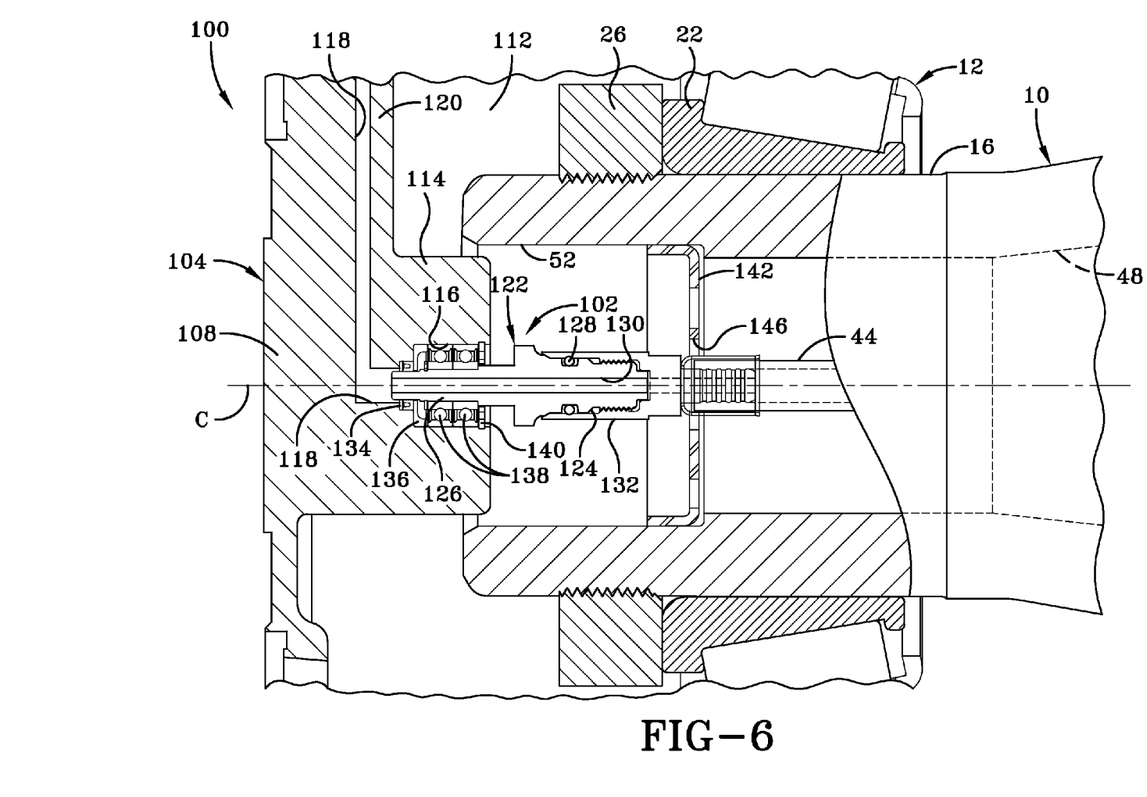
FIG. 6 is an enlarged view of the portion of FIG. 5 encircled by the dashed lines labeled "See FIG. 6"
Figure 7:
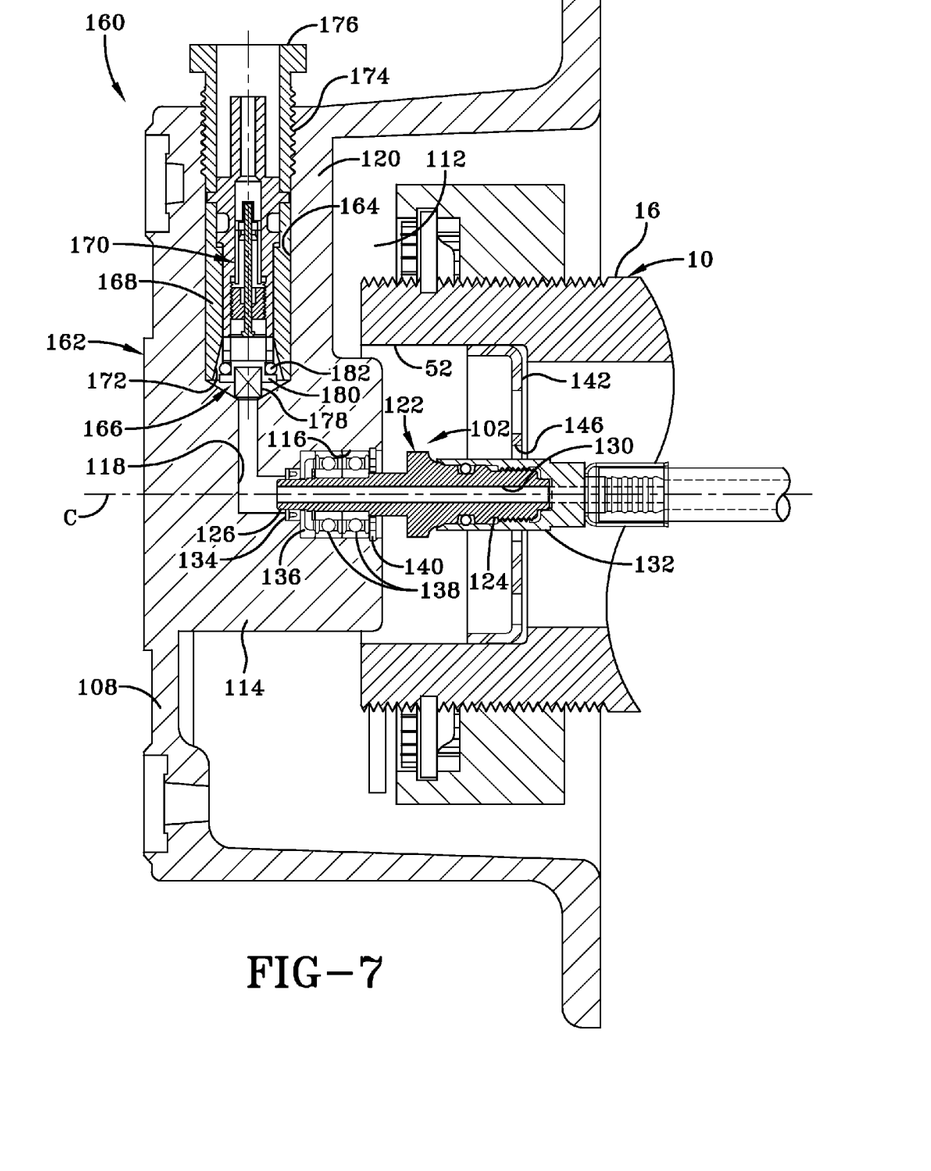
FIG. 7 is a fragmentary cross-sectional elevational view of an axle spindle and a portion of a wheel end assembly, with hidden portions shown in dashed lines, and showing a second embodiment integrated rotary union and hub cap of the present invention mounted thereon.
Figure 8:
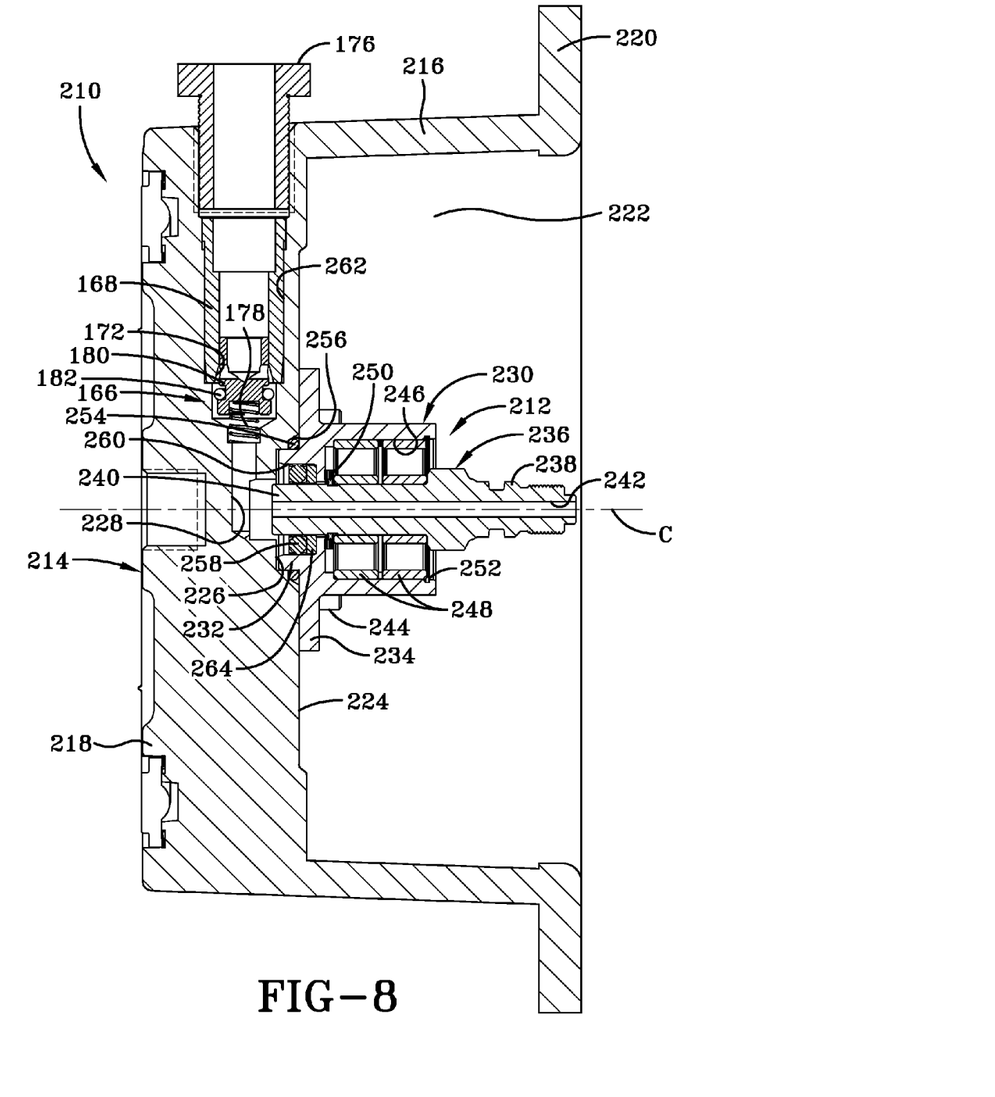
FIG. 8 is a cross-sectional elevational view of a third embodiment integrated rotary union and hub cap of the present invention.

Turning now to the drawings of the present invention, a first exemplary embodiment integrated rotary union and hub cap is shown in FIGS. 5 and 6, a second exemplary embodiment integrated rotary union and hub cap is shown in FIG. 7, and a third exemplary embodiment integrated rotary union and hub cap is shown in FIG. 8.

With particular reference to FIGS. 5 and 6, first embodiment integrated rotary union and hub cap is indicated generally at 100. Integrated rotary union and hub cap 100 includes a rotary union 102 and a hub cap 104. Hub cap 104 includes a cylindrical sidewall 106, and an outboard wall 108 integrally formed with the outboard end of the side wall and extending generally perpendicular to the sidewall. Preferably, a radially-extending flange 110 is formed on the inboard end of sidewall 106, and is formed with a plurality of bolt openings (not shown) to enable bolts to secure hub cap 104 to the outboard end of wheel hub 28. In this manner, hub cap 104 defines an interior compartment 112. It is to be understood that means known to those skilled in the art other than bolts may be used to secure hub cap 104 to wheel hub 28, such as a threaded connection between the hub cap and wheel hub, other types of mechanical fasteners, and/or a press fit.

A cylindrical boss structure 114 is formed on interior surface of outboard wall 108, and protrudes inboardly from the outboard wall into interior compartment 112 of hub cap 104. Boss 114 is aligned with axial centerline C of axle spindle 16 to facilitate convenient and proper alignment of rotary union 102, as will be described in greater detail below. A cavity 116 is formed in the inboard end of boss 114 in alignment with axial centerline C of axle spindle 16, and is in fluid communication with an air passage 118 formed in hub cap 104. Cavity 116 is formed in boss 114 with tight tolerances by machining or other suitable processes known to those skilled in the art, such as molding or casting.

Figure 13:
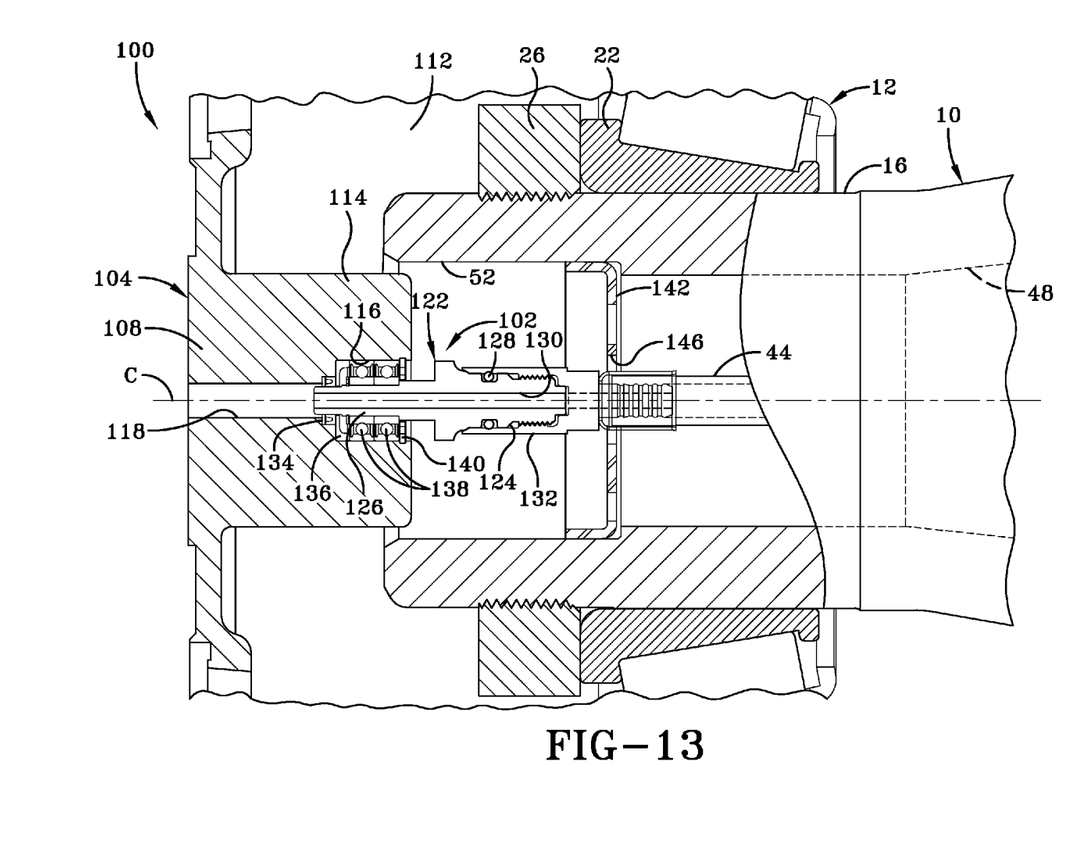
FIG. 13 is an enlarged fragmentary cross-sectional elevational view of an alternative aspect of an integrated rotary union and hub cap of the present invention, in which the integrated rotary union and hub cap is shown mounted on an axle spindle and wheel end assembly, with hidden portions shown in dashed lines.

A shoulder 120 is fowled on the interior surface of outboard wall 108 of hub cap 104 and extends inboardly into interior compartment 112. Shoulder 120 extends radially outwardly from boss 114 to hub cap cylindrical sidewall 106. Air passage 118 is formed in shoulder 120, extending from cavity 116 in boss 114 radially outwardly through hub cap sidewall 106 for convenient connection to air hoses that extend to the tires (not shown). Alternatively, as shown in FIG. 13, hub cap 104 may be formed without shoulder 120, in which case air passage 118 extends axially from boss 114 directly outboardly through hub cap outboard wall 108 for connection to air hoses that extend to the tires.

Rotary union 102 is installed directly into cavity 116 in boss 114, and is thereby integrated into the interior of hub cap 104, as will be described in greater detail below. Rotary union 102 includes a stem 122, which in turn includes an inboard portion 124 and an outboard portion 126. Inboard portion 124 threadably engages a female hose connector 132 of tire inflation system pneumatic conduit 44. A gasket or seal 128 is disposed between inboard portion 124 of rotary union stem 122 and female hose connector 132 to fluidly seal the connection between the two. Rotary union stem 122 is formed with a central bore 130 which aligns with the inner diameter of pneumatic conduit 44 to facilitate the passage of air through rotary union 102. It is to be understood that, alternatively, axle 10 may be a pressurized axle, in which case pneumatic conduit 44 is not utilized, and rotary union stem 122 fluidly communicates directly with the pressurized air in axle central bore 48.

Outboard portion 126 of rotary union stem 122 is mounted in hub cap 104. To facilitate this mounting, each one of a pair of bearings 138 is pressed onto outboard portion 126 of rotary union stem 122. A U-cup seal 134 and a seal retainer 136, respectively, are inserted into cavity 116, and outboard portion 126 of rotary union stem 122, with bearings 138 and snap ring 140, are pressed into the cavity. A snap ring 140 is then installed in a groove machined in cavity 116 inboardly of bearings 138. This assembly of outboard U-cup seal 134, seal retainer 136, bearings 138, and inboard snap ring 140 facilitates proper alignment of rotary union 102. Since cavity 116 is a tight-tolerance cavity that is formed about axial centerline C of axle spindle 16, which is the rotational centerline of the axle spindle and hub cap 104, rotary union stem 122 is securely maintained in proper alignment along the axial centerline.

To facilitate the connection of rotary union 102 to tire inflation system pneumatic conduit 44, a spindle plug 142 is press fit or force fit into tight-tolerance counterbore 52 machined in the outboard end of axle bore 48. Spindle plug is formed with a central opening 146 that is aligned with axial centerline C of axle spindle 16, and allows female hose connector 132 of tire inflation system pneumatic conduit 44 to pass through the spindle plug and connect to inboard portion 124 of rotary union stem 122. Preferably, hose connector 132 threadably engages inboard portion 124 of rotary union stem 122.

In this manner, tire inflation system conduit 44 in axle bore 48 pneumatically connects to rotary union stem 122, and air passes through central bore 130 formed in rotary union stem 122 and into aligned air passage 118 formed in hub cap 104. Bearings 138 mounted on outboard portion 126 of stem 122 enable hub cap 104 to rotate about the rotary union stem, which remains static while air is communicated from tire inflation system 40 to the tires.

This construction of integrated rotary union and hub cap 100 eliminates problems due to possible misalignment of the rotary union components relative to axle spindle 16 during installation. In addition, the construction of integrated rotary union and hub cap 100, by enabling rotary union 102 to seat in hub cap 104, enables a variety of wheel hub sizes and hub cap sizes to be employed, and eliminates the need to use spacers for the hub cap. More particularly, because rotary union 102 seats in hub cap 104 and the only other component to which it connects is flexible pneumatic conduit 44, the rotary union is able to move inboardly and outboardly along the length of axial centerline C. This ability to be moved satisfies any axial displacement that is needed to accommodate different hub face surface dimensions relative to axle spindle end 16, different hub cap dimensions, and/or different sizes and types of lock nuts.

Turning now to FIG. 7, second embodiment integrated rotary union and hub cap is indicated generally at 160. Second embodiment integrated rotary union and hub cap 160 includes the same rotary union stem 122 and construction of bearing assembly components 134, 136, 138 140 as first embodiment integrated rotary union and hub cap 100, but utilizes a hub cap 162 that is different from the first embodiment. More particularly, hub cap 162 of second embodiment integrated rotary union and hub cap 160 is formed with a bore 164 to enable the direct connection of tire hoses to the hub cap without the need for external elbow or tee fittings, and also provides a poppet valve assembly 166 which is integrated into the hub cap.

More particularly, cylindrical boss 114 is formed on the interior surface of outboard wall 108 of hub cap 162, and protrudes inboardly from the outboard wall into interior compartment 112 of the hub cap. Shoulder 120 is formed on the interior surface of outboard wall 108 of hub cap 162 and extends axially inboardly into interior compartment 112 and radially outwardly from boss 114 to hub cap cylindrical sidewall 106. Air passage 118 is formed in shoulder 120, extending from cavity 116 in boss 114 and radially outwardly toward hub cap sidewall 106. Bore 164 is formed in shoulder 120, extending from the exterior of hub cap cylindrical sidewall 106 radially inwardly about air passage 118. Bore 164 is a larger diameter than air passage 118 and is aligned with the air passage. The radial depth of bore 164 from the exterior of hub cap sidewall 106 is suitable to enable the connection of tire hoses, as will be described below.

Bore 164 receives a tire hose, which includes a threaded coupling 176. Hub cap 162 preferably is formed with features such as threads 174 about bore 164 adjacent hub cap sidewall 106, which threadably engage coupling 176 to secure the direct connection of the tire hose to the hub cap. The tire hose also includes a Schrader valve or check valve assembly 170, which prevents excessive escape of air from the tire upon removal of the tire hose. A fixed bushing or sleeve 168 is received in bore 164, and Schrader valve assembly 170 seats in the sleeve. Preferably, when tire hose coupling 176 is uncoupled and removed from bore 164, Schrader valve assembly 170 remains with the hose coupling, and sleeve 168 remains in the bore.

Poppet valve assembly 166 prevents excessive venting of air from tire inflation system 40 upon the removal of the tire hose from hub cap 162. More particularly, sleeve 168 is formed with a taper 172 on its radially inward end, which corresponds to the radially inward end of bore 164. Poppet valve assembly includes a spring 178 that abuts air passage 118, a seat 180 that engages the spring, and an o-ring 182 mounted on the seat. When the tire hose is connected to hub cap 162, Schrader valve assembly 170 pushes seat 180, o-ring 182 and spring 178 radially inwardly, which creates a space between the o-ring and sleeve taper 172. Air flows from pneumatic conduit 44, through rotary union 102, through air passage 118, through spring 178 and through the space between o-ring 182 and sleeve taper 172. However, when the tire hose is removed from hub cap 162, the bias of spring 178 urges seat 180 and o-ring 182 radially outwardly, so that the o-ring contacts sleeve taper 172 to close the space or gap, thereby preventing air from flowing out of tire inflation system 40 to atmosphere. Poppet valve assembly 166 thus provides a check valve for tire inflation system 40 that is integrated into hub cap 162.

In this manner, air passes through tire inflation system conduit 44 in axle bore 48, through central bore 130 formed in rotary union stem 122, through aligned air passage 118, through poppet valve assembly 166 and Schrader valve assembly 170 disposed in bore 164, and through the tire hoses. As a result, second embodiment integrated rotary union and hub cap 160 eliminates the need to protect an elbow or tee fitting with a guard, since no components other than the tire hose(s) are exposed outside of the exterior of hub cap 162. Elimination of such a guard reduces cost and weight, and also reduces the components that need to be removed and re-installed when servicing the system.

Turning now to FIG. 8, third embodiment integrated rotary union and hub cap is indicated generally at 210. Third embodiment integrated rotary union and hub cap 210 is similar to second embodiment integrated rotary union and hub cap 160, with the exception that the third embodiment integrated rotary union and hub cap includes a rotary union housing that bolts to an inboard surface of the hub cap, as will be described in greater detail below.

Third embodiment integrated rotary union and hub cap 210 includes a rotary union 212 and a hub cap 214. Hub cap 214 includes a cylindrical sidewall 216, and an outboard wall 218 integrally formed with the outboard end of the side wall and extending generally perpendicular to the sidewall. A radially-extending flange 220 is formed on the inboard end of side wall 216, and is formed with a plurality of bolt openings (not shown) to enable bolts to secure hub cap 214 to the outboard end of wheel hub 28 (FIG. 5). In this manner, hub cap 214 defines an interior compartment 222.

Hub cap outboard wall 218 includes an inboard surface 224, and a cylindrical cavity 226 is formed in the inboard surface in alignment with axial centerline C of axle spindle 16 (FIG. 6). Cylindrical cavity 226 is in fluid communication with an air passage 228 that is formed in hub cap outboard wall 218, as will be described in greater detail below. Rotary union 212 protrudes into interior compartment 222 of hub cap 214, and includes a cylindrical housing 230, which mounts on inboard surface 224 of hub cap outboard wall 218.

More particularly, housing 230 is formed with an outboardly-extending shoulder 232 and a radially-extending flange 234. Shoulder 232 is received in cylindrical cavity 226, and an outboard surface of flange 234 abuts hub cap outboard wall inboard surface 224. The positive mechanical engagement of shoulder 232 in cavity 226, and of flange 234 against inboard surface 224, causes rotary union housing 230 and thus rotary union 212 to be aligned with axial centerline C of axle spindle 16. Bolts 244 or other fastening means, including mechanical fasteners and joining techniques, such as welding, adhesives, and the like, preferably are used to secure rotary union housing 230 to inboard surface 224 of hub cap outboard wall 218. To provide a seal between housing 230 and inboard surface 224 of hub cap outboard wall 218, a gasket 254 may optionally be disposed about shoulder 232 in a groove 256 that is formed about cavity 226.

Rotary union 212 includes a stem 236, which in turn includes an inboard portion 238 and an outboard portion 240. Inboard portion 238 threadably engages a female hose connector 132 (FIG. 6) of tire inflation system pneumatic conduit 44 (FIG. 6). Rotary union stem 236 is formed with a central bore 242 which aligns with the inner diameter of pneumatic conduit 44 to facilitate the passage of air through rotary union 212. It is to be understood that, alternatively, axle 10 may be a pressurized axle, in which case pneumatic conduit 44 is not utilized, and rotary union stem 236 fluidly communicates directly with the pressurized air in axle central bore 48 (FIG. 6).

Outboard portion 240 of rotary union stem 236 is rotatably mounted in housing 230. More particularly, housing 230 is formed with a mounting cavity 246, and an outboard snap ring 250 is inserted into the mounting cavity. Each one of a pair of bearings 248 is pressed onto rotary union stem outboard portion 240, and the outboard portion of the stem, with the bearings, is pressed into mounting cavity 246. An inboard snap ring 252 is disposed in a groove machined in mounting cavity 246 inboardly of bearings 248. To provide an additional seal between rotary union stem outboard portion 240 and rotary union housing 230, an outboard groove 260 is formed in the housing, and an o-ring 258 and a flexible lip seal 264 are disposed in the groove on the outboard portion of rotary union stem 236. This assembly of o-ring 258, lip seal 264, outboard snap ring 250, bearings 248, and inboard snap ring 252 facilitates proper alignment and fluid sealing of rotary union 212. Because mounting cavity 246 formed in housing 230 is a tight-tolerance cavity that is formed about axial centerline C of axle spindle 16, which is the rotational centerline of the axle spindle and hub cap 214, rotary union stem 236 is securely maintained in proper alignment along the axial centerline.

The connection of rotary union 212 to tire inflation system pneumatic conduit 44 is the same as described above for first and second embodiments integrated rotary union and hub cap 100, 160, respectively. Air passage 228 extends radially outwardly in outboard wall 218 of hub cap 214 from cylindrical cavity 226 toward hub cap sidewall 216. Similar to second embodiment integrated rotary union and hub cap 160, third embodiment integrated rotary union and hub cap 210 includes a bore 262 formed in outboard wall 218, extending from the exterior of hub cap sidewall 216 radially inwardly about air passage 228. Bore 262 is a larger diameter than air passage 228 and is aligned with the air passage.

Bore 262 receives a tire hose, which includes threaded coupling 176 to secure the direct connection of the tire hose to hub cap 210. Sleeve 168 is received in bore 262, and Schrader valve or check valve assembly 170 (FIG. 7) seats in the sleeve to prevent excessive escape of air from the tire upon removal of the tire hose. As with second embodiment integrated rotary union and hub cap 160, third embodiment integrated rotary union and hub cap 210 includes poppet valve assembly 166, which prevents excessive venting of air from tire inflation system 40 upon the removal of the tire hose from hub cap 214. More particularly, poppet valve assembly 166 includes spring 178, seat 180, and o-ring 182 mounted on the seat. When the tire hose is connected to hub cap 214, Schrader valve assembly 170 pushes seat 180, o-ring 182 and spring 178 radially inwardly, which creates a space between the o-ring and sleeve taper 172. Thus, air flows through rotary union 212, through air passage 228, through spring 178 and through the space between o-ring 182 and sleeve taper 172. When the tire hose is removed from hub cap 214, the bias of spring 178 urges seat 180 and o-ring 182 radially outwardly, so that the o-ring contacts sleeve taper 172 to close the space or gap, thereby preventing air from flowing out of tire inflation system 40 to atmosphere. In this manner, poppet valve assembly 166 provides a check valve for tire inflation system 40 that is integrated into hub cap 214.

The construction of third embodiment integrated rotary union and hub cap 210 enables air to pass through tire inflation system conduit 44 in axle bore 48 (FIG. 6), through central bore 242 formed in rotary union stem 236, through aligned air passage 228, through poppet valve assembly 166 and Schrader valve assembly 170 disposed in bore 262, and through the tire hoses to the tires (not shown). As a result, third embodiment integrated rotary union and hub cap 210 eliminates the need to protect an elbow or tee fitting with a guard, since no components other than the tire hose(s) are exposed outside of the exterior of hub cap 214. Elimination of such a guard reduces cost and weight, and also reduces the components that need to be removed and re-installed when servicing the system. In addition, since third embodiment integrated rotary union and hub cap 210 includes rotary union housing 230, which bolts to inboard surface 224 of hub cap outboard wall 218, the need to form a hub cap with an integral boss structure 114 is eliminated, which may reduce the cost of forming hub cap 214.

The integrated rotary union and hub cap 100, 160, 210 of the present invention incorporates rotary union 102, 212 that is securely disposed in the interior of hub cap 104, 162, 214 in alignment with axial centerline C of the hub cap and axle spindle 16. First and second embodiments integrated rotary union and hub cap 100, 160, respectively, employ rotary union 102 disposed in cavity 116 formed in boss 114 of hub cap 104, 162, while third embodiment integrated rotary union and hub cap 210 employs rotary union 212 that is mechanically fastened or secured to inboard surface 224 of hub cap outboard wall 218. This construction provides simple installation of rotary union 102, 212 in hub cap 104, 162, 214 in a dependably aligned manner.

In addition, air passage 118, 228 formed in hub cap 104, 162, 214, respectively, enables the fluid communication of air from rotary union 102, 212 to tire hoses through the hub cap, thereby eliminating the need for additional components such as guards, elbow fittings and/or tee fittings. Moreover, second and third embodiments integrated rotary union and hub cap 160, 210 include a bore 164, 262 in hub cap 162, 214, respectively, which enables the direct coupling of tire hoses to the hub cap, thereby eliminating the need for guards, and also enables the incorporation of poppet valve or check valve assembly 166 into the hub cap.

It is to be understood that the present invention finds application in all types of tire inflation systems, hub caps, heavy-duty axle spindles, wheel end assemblies, and vehicles known to those skilled in the art, including other types of tire inflation systems, hub caps, axle spindles, wheel end assemblies, and vehicles than those shown and described herein and known to those skilled in the art, without affecting the concept or operation of the invention. For example, axle 10 may be a pressurized axle, in which case pneumatic conduit 44 is not utilized, and rotary union 102 fluidly communicates directly with the pressurized air in axle central bore 48.

It is to be understood that means known to those skilled in the art to mount or secure hub cap 104, 162, 214 to the outboard end of wheel hub 28 other than flange 110, 220 and mechanical fasteners may be employed without affecting the concept or operation of the invention. For example, hub cap 104, 162, 214 may be threaded into or on to the outboard end of wheel hub 28, press fit on the outboard end of the hub, riveted onto the hub, and the like. Of course, the particular construction and arrangement of hub cap 104, 162, 214 may be adjusted to accommodate such various securing means.

It is also to be understood that other shapes and configurations for hub cap 104, 162, 214 other than those shown and described above may be employed without affecting the concept or operation of the invention. For example, rather than hub cap 104, 162, 214 being formed with a cylindrical sidewall 106, 216 and an outboard wall 108, 218 that extends generally perpendicular to the sidewall, the hub cap may be formed with a single wall that has a dome, conical or other shape. Moreover, hub cap 104, 162, 214 may be formed with multiple walls that are stepped, or have a rectangular, octagonal or other geometric shape. Of course, the particular construction and arrangement of hub cap 104, 162, 214 may be adjusted to accommodate such various shapes and configurations.

Figure 9:
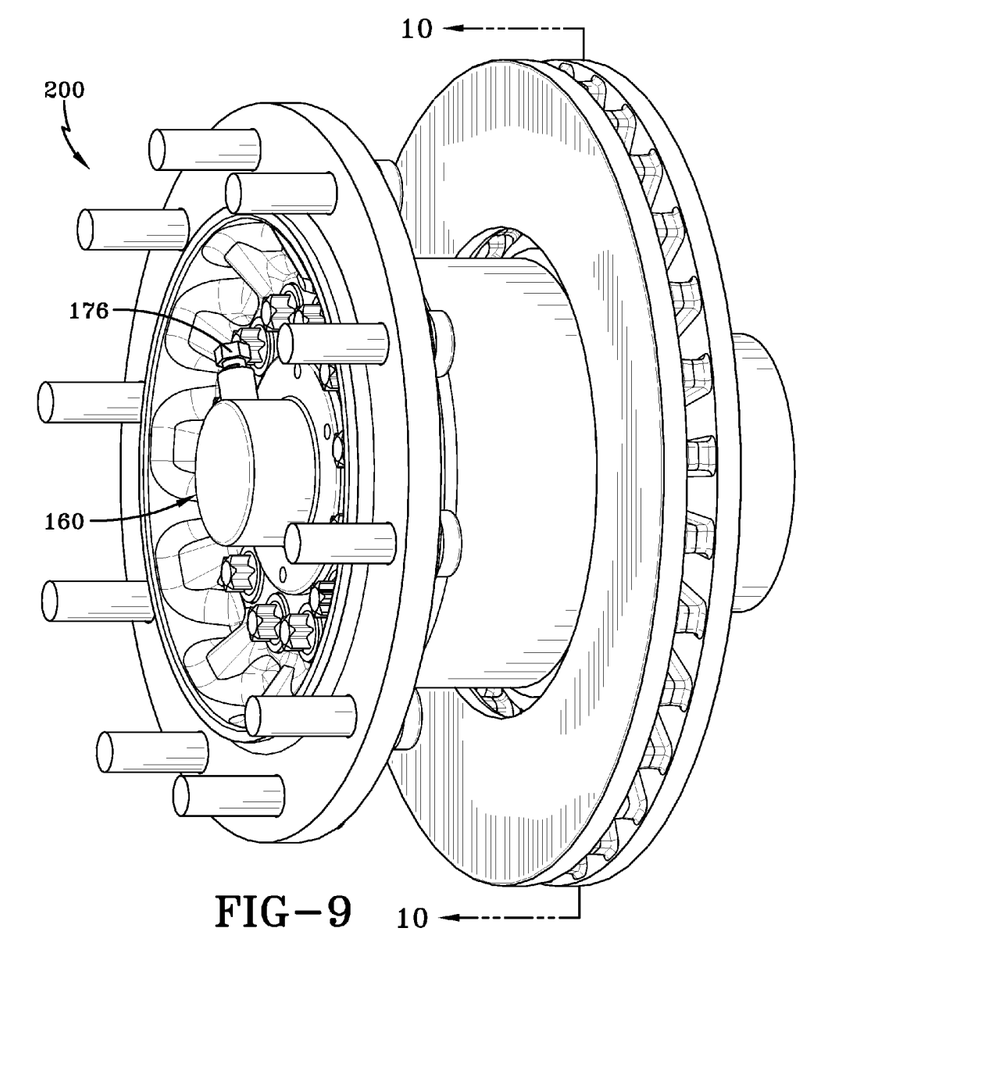
FIG. 9 is a perspective view of a cap-style wheel flange with an integrated rotary union and hub cap of the present invention mounted thereon.
Figure 10:
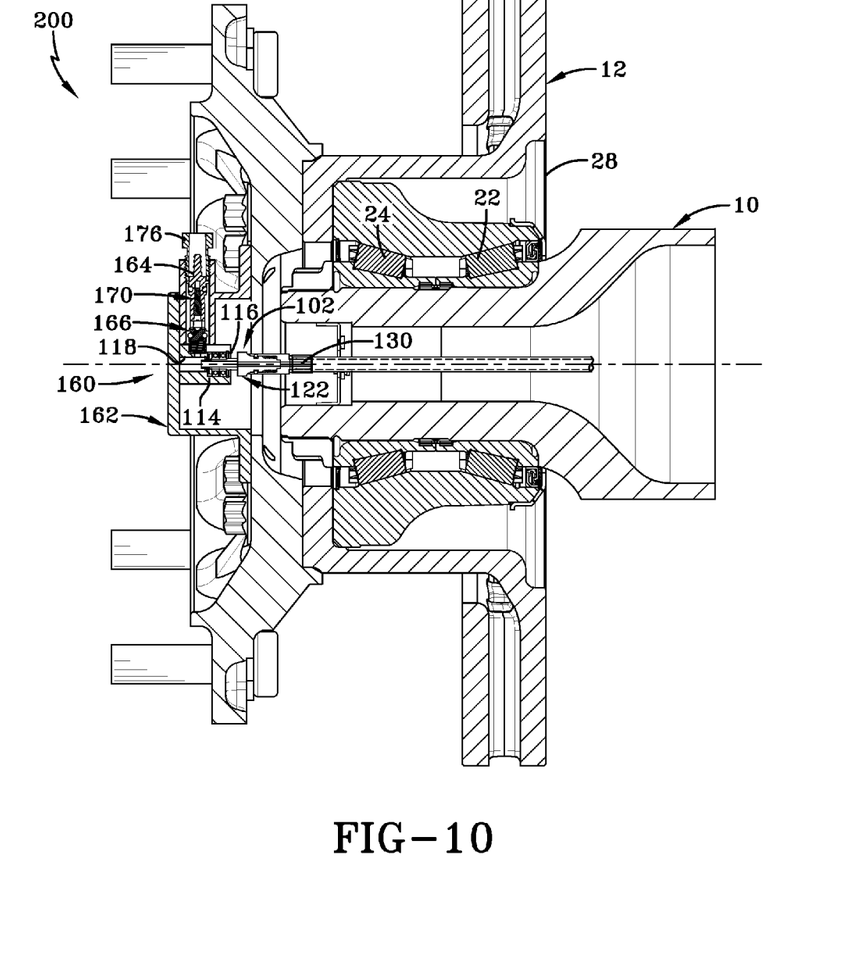
FIG. 10 is a cross-sectional elevational view of the wheel flange and integrated rotary union and hub cap shown in FIG. 9 taken along lines 10-10.
Figure 11:
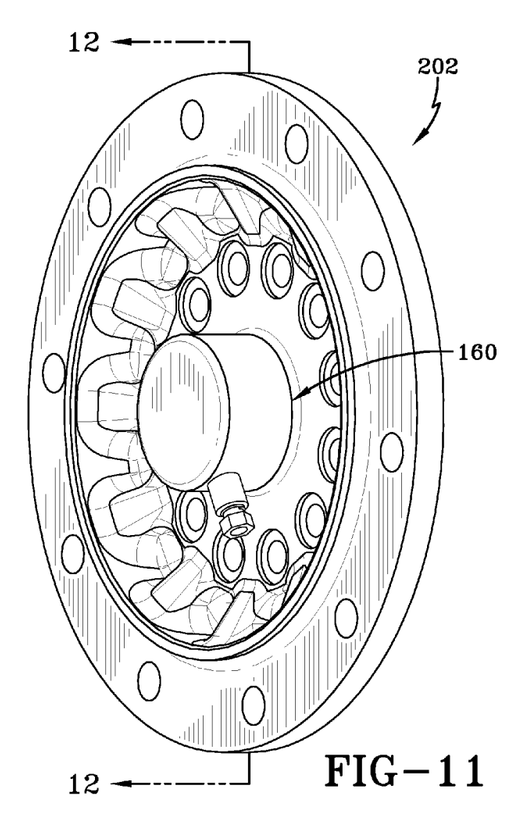
FIG. 11 is a perspective view of a blind-style wheel flange with a rotary union of the present invention integrated therein.
Figure 12:
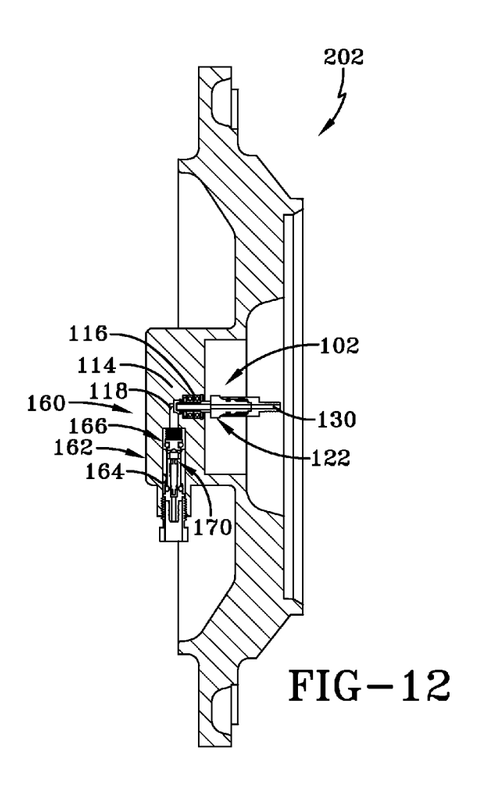
FIG. 12 is a cross-sectional elevational view of the wheel flange and integrated rotary union shown in FIG. 11 taken along lines 12-12.

In addition, integrated rotary union and hub cap 100, 160, 210 of the present invention may be adapted for use on a cap-style wheel flange or wheel adaptor/adapter 200 as shown in FIGS. 9 and 10, or a blind wheel flange or wheel adaptor/adapter 202 as shown in FIGS. 11 and 12. More particularly, with reference to FIGS. 9 and 10 and using second embodiment integrated rotary union and hub cap 160 by way of example, the design of boss 114, cavity 116, air passage 118 and optionally bore 164 is incorporated into cap-style wheel flange 200. That is, cap-style wheel flange 200 essentially functions as hub cap 160. Air thus passes through central bore 130 formed in rotary union stem 122, through aligned air passage 118, through poppet valve assembly 166 and Schrader valve assembly 170 disposed in bore 164, and to the tire hoses, as described above.

Again using second embodiment integrated rotary union and hub cap 160 by way of example, and turning to FIGS. 11 and 12, the design of boss 114, cavity 116, air passage 118 and optionally bore 164 is incorporated into blind wheel flange 202, enabling air to pass through central bore 130 formed in rotary union stem 122, through the aligned air passage, through poppet valve assembly 166 and Schrader valve assembly 170, and to the tire hoses as described above. Alternatively, integrated rotary union and hub cap 100, 160, 210 of the present invention may be adapted for use directly on a hub assembly or a brake rotor assembly without affecting the overall concept or operation of the invention.

Accordingly, the improved integrated rotary union and hub cap is simplified, provides an effective, safe, inexpensive, and efficient structure which achieves all the enumerated objectives, provides for eliminating difficulties encountered with prior art rotary unions and hub caps, and solves problems and obtains new results in the art.

In the foregoing description, certain terms have been used for brevity, clarity and understanding; but no unnecessary limitations are to be implied therefrom beyond the requirements of the prior art, because such terms are used for descriptive purposes and are intended to be broadly construed. Moreover, the present invention has been described with reference to exemplary embodiments. It shall be understood that this illustration is by way of example and not by way of limitation, as the scope of the invention is not limited to the exact details shown or described. Potential modifications and alterations will occur to others upon a reading and understanding of this disclosure, and it is understood that the invention includes all such modifications and alterations and equivalents thereof.

Having now described the features, discoveries and principles of the invention, the manner in which the improved integrated rotary union and hub cap is constructed, arranged and used, the characteristics of the construction and arrangement, and the advantageous, new and useful results obtained; the new and useful structures, devices, elements, arrangements, parts and combinations are set forth in the appended claims.

What is claimed is:

1. An integrated rotary union and hub cap for a wheel end assembly of a vehicle, said wheel end assembly including a wheel hub having an outboard end, said integrated rotary union and hub cap comprising:
   a hub cap portion, said hub cap portion including:
      at least one wall forming an interior compartment in the hub cap portion; and
      means for mounting said hub cap portion on said outboard end of said wheel hub; and
   a rotary union portion, said rotary union portion being mounted in a housing, said housing being formed with a flange, said flange being rigidly attached to an interior surface of said wall, the housing protruding inboardly from the wall into and being contained entirely within said hub cap portion interior compartment, whereby the rotary union portion provides fluid communication from a tire inflation system to tires of said vehicle when the hub cap portion is mounted on said outboard end of said wheel hub.

2. The integrated rotary union and hub cap for a wheel end assembly of a vehicle of claim 1, wherein said rotary portion union includes a stem, said stem including an inboard portion and an outboard portion, said outboard portion of the rotary union stem being mounted in said housing.

3. The integrated rotary union and hub cap for a wheel end assembly of a vehicle of claim 2, wherein at least one bearing is mounted on said outboard portion of said rotary union stem, the outboard portion of the stem and said bearing being received in a mounting cavity formed in said housing.

4. The integrated rotary union and hub cap for a wheel end assembly of a vehicle of claim 1, wherein said rotary union portion includes a stem, said stem including an inboard portion and an outboard portion, said inboard portion of the rotary union stem engaging a hose connector of a pneumatic conduit of said tire inflation system.

5. The integrated rotary union and hub cap for a wheel end assembly of a vehicle of claim 1, wherein said wheel hub is mounted on a pressurized axle, and said rotary union portion fluidly communicates directly with pressurized air in a central bore of said axle.

6. The integrated rotary union and hub cap for a wheel end assembly of a vehicle of claim 1, wherein an air passage is formed in said wall of said hub cap portion, said air passage being in fluid communication with said rotary union portion and with said tires.

7. The integrated rotary union and hub cap for a wheel end assembly of a vehicle of claim 6, wherein said hub cap portion includes a shoulder formed on an interior surface of said wall, said shoulder extending radially outwardly from an axial center area of said hub cap, and said air passage is formed in said shoulder.

8. The integrated rotary union and hub cap for a wheel end assembly of a vehicle of claim 7, further comprising a bore formed in said shoulder, said bore extending from an exterior of said wall of said hub cap radially inwardly about said air passage, the bore receiving a tire hose coupling.

9. The integrated rotary union and hub cap for a wheel end assembly of a vehicle of claim 8, further comprising a poppet valve assembly disposed in said bore, said poppet valve assembly providing a tire inflation system check valve that is integrated into said hub cap portion.

10. The integrated rotary union and hub cap for a wheel end assembly of a vehicle of claim 6, further comprising a bore formed in said wall of said hub cap portion, said bore extending from an exterior of the wall radially inwardly about said air passage, the bore receiving a tire hose coupling.

11. The integrated rotary union and hub cap for a wheel end assembly of a vehicle of claim 10, further comprising a poppet valve assembly disposed in said bore, said poppet valve assembly providing a tire inflation system check valve that is integrated into said hub cap portion.

12. The integrated rotary union and hub cap for a wheel end assembly of a vehicle of claim 1, wherein said hub cap portion is a cap-style wheel flange.

13. The integrated rotary union and hub cap for a wheel end assembly of a vehicle of claim 1, wherein said at least one wall includes:
a generally cylindrical sidewall, said sidewall being formed with said means for mounting said hub cap portion on said outboard end of said wheel hub; and
an outboard wall being integrally formed with an outboard end of said sidewall and extending generally perpendicular to the sidewall; and
said sidewall and said outboard wall form said interior compartment in said hub cap portion.

14. The integrated rotary union and hub cap for a wheel end assembly of a vehicle of claim 1, wherein said means for mounting said hub cap portion on said outboard end of said wheel hub includes a radially-extending flange formed on an inboard end of said at least one wall, said flange being formed with a plurality of openings for receiving fasteners to mount said hub cap on said outboard end of said wheel hub.

15. The integrated rotary union and hub cap for a wheel end assembly of a vehicle of claim 1, wherein said at least one wall of said hub cap portion is a closed outboard wall.

16. An integrated check valve and hub cap for a wheel end assembly of a vehicle, said wheel end assembly including a wheel hub having an outboard end, said integrated check valve and hub cap comprising:
a hub cap portion, said hub cap portion including:
at least one wall being formed with a bore, said bore extending from an exterior of said wall radially inwardly and being in fluid communication with a rotary union and with tires of said vehicle; and
means for mounting said hub cap portion on said outboard end of said wheel hub;
a check valve portion, said check valve portion including a valve assembly disposed in said bore, thereby providing a tire inflation system check valve that is integrated into said hub cap portion; and
a rotary union portion, said rotary union portion being mounted in a housing, said housing being formed with a flange, said flange being rigidly attached to an interior surface of said hub cap wall, the housing protruding inboardly from the wall into an interior compartment of said hub cap portion, the rotary union portion providing fluid communication from a tire inflation system to tires of said vehicle when the hub cap portion is mounted on said outboard end of said wheel hub.

17. An integrated rotary union and hub cap for a wheel end assembly of a vehicle, said wheel end assembly including a wheel hub having an outboard end, said integrated rotary union and hub cap comprising:
a hub cap portion, said hub cap portion including:
at least one wall forming an interior compartment in the hub cap portion; and
means for mounting said hub cap portion on said outboard end of said wheel hub;
a rotary union portion, said rotary union portion mounted in a housing, said housing being attached to an interior surface of said wall and protruding inboardly from the wall into said hub cap portion interior compartment, the rotary union portion providing fluid communication from a tire inflation system to tires of said vehicle when the hub cap portion is mounted on said outboard end of said wheel hub;
a shoulder formed on one of said housing and said interior surface of said wall; and
a cavity formed in the other of said housing and said interior surface of said wall, whereby said shoulder engages said cavity to provide alignment of said rotary union portion with a centerline of an axle spindle.

18. The integrated rotary union and hub cap for a wheel end assembly of a vehicle of claim 17, wherein said shoulder is formed on said housing and said cavity is formed in said interior surface of said wall, and said housing further includes a flange that abuts the interior surface of the wall.

* * * * *